United States Patent
Takagi

(10) Patent No.: US 8,988,702 B2
(45) Date of Patent: Mar. 24, 2015

(54) PRINTING APPARATUS AND PRINTING METHOD

(75) Inventor: Akimasa Takagi, Shiojin (JP)

(73) Assignee: Seiko Epson Corporation, Tokyo (JP)

( * ) Notice: Subject to any disclaimer, the term of this patent is extended or adjusted under 35 U.S.C. 154(b) by 1867 days.

(21) Appl. No.: 11/158,828

(22) Filed: Jun. 22, 2005

(65) Prior Publication Data

US 2005/0286079 A1    Dec. 29, 2005

(30) Foreign Application Priority Data

Jun. 24, 2004    (JP) ................................. 2004-186360

(51) Int. Cl.
*G06F 3/12*    (2006.01)
*G06K 15/02*    (2006.01)
*G07G 1/00*    (2006.01)
*G07G 5/00*    (2006.01)

(52) U.S. Cl.
CPC .............. *G06K 15/02* (2013.01); *G07G 1/0018* (2013.01); *G07G 5/00* (2013.01); *G06K 2215/0082* (2013.01)
USPC ........ 358/1.15; 358/518; 358/1.13; 358/1.14; 358/3.23; 358/524

(58) Field of Classification Search
USPC ............... 358/518, 3.23, 530, 523–525, 1.13, 358/1.14, 1.15
See application file for complete search history.

(56) References Cited

U.S. PATENT DOCUMENTS

| | | | | |
|---|---|---|---|---|
| 5,754,750 A | * | 5/1998 | Butterfield et al. ........... | 345/418 |
| 5,850,217 A | | 12/1998 | Cole | |
| 7,407,251 B2 | * | 8/2008 | Akase .............................. | 347/19 |
| 7,460,252 B2 | | 12/2008 | Campbell et al. | |
| 2002/0089560 A1 | * | 7/2002 | Katayama et al. .............. | 347/16 |
| 2002/0126901 A1 | * | 9/2002 | Held .............................. | 382/199 |
| 2003/0086740 A1 | * | 5/2003 | Miyajima ..................... | 400/621 |
| 2003/0231320 A1 | * | 12/2003 | Tsunekawa .................... | 358/1.2 |
| 2004/0041022 A1 | * | 3/2004 | Minowa et al. ................ | 235/383 |
| 2004/0117301 A1 | * | 6/2004 | Fujisawa et al. ................ | 705/39 |
| 2005/0073710 A1 | * | 4/2005 | Campbell et al. ............ | 358/1.14 |
| 2005/0242178 A1 | * | 11/2005 | Minowa ........................ | 235/383 |

FOREIGN PATENT DOCUMENTS

| | | | |
|---|---|---|---|
| JP | 06-155820 | | 6/1994 |
| JP | 11224169 A | * | 8/1999 |
| JP | 2000-025297 | | 1/2000 |
| JP | 2001-216121 | | 8/2001 |
| JP | 2002-132474 | | 5/2002 |
| JP | 2002-215371 | | 8/2002 |
| JP | 2003-211745 | | 7/2003 |
| JP | 2004-058323 | | 2/2004 |
| JP | 2004-058323 A | | 2/2004 |
| JP | 2004-164234 | | 6/2004 |

* cited by examiner

*Primary Examiner* — Huo Long Chen

(57) ABSTRACT

A printer and printing control method to enable print data received from a host computer to be selectively deleted without modifying the host computer or application. A data receiving unit 100 receives print data from a host computer 40. A deletion line parameter unit 81 sets the number of deletion lines that are to be deleted from the received print data. A print data deletion unit 87 deletes the print data corresponding to the deletion lines set by the deletion line parameter unit 81. A printing unit 120 then prints a receipt using the actual (i.e., corrected) print data, which is the received print data remaining after deletion of the selected deletion lines by the print data deletion unit 87.

11 Claims, 10 Drawing Sheets

[Deletion line parameter and logo configuration parameter editor]

D1

/Deletion line parameters\ /Logo parameters\ a:
- a-1 ☑ Set deletion line directly
- Delete from line [6] a-2 to line [1] a-3 b:
- b-1 ☑ Set deletion line from first line
- Delete [3] b-2 lines from first line c:
- c-1 ☑ Set deletion line from last line
- Delete [1] c-2 lines from last line d:
- d-1 ☑ Set deletion line using specific character string
- String [strawberry] d-2
- Delete [0] d-3 lines from next line
- ○ Delete ● Do not delete specific character string line
  d-4    d-5

[OK] [Cancel]
  2    3

D2

/Deletion line parameters\ /Logo parameters\ e:
- e-1 ☑ Print top logo at beginning of receipt
- Select top logo image file
- e-2 [C:fire.jpg] [lookup...] e-3 f:
- ☑ Print bottom logo at end of receipt
- f-1 Select bottom logo image file
- f-2 [C:thankyou.jpg] [lookup...] f-3 g:
- ☑ Print keyword logo
- g-1 Select keyword logo image file
- g-2 [C:strawberry.jpg] [lookup...] g-3
- Print keyword logo ○ before ● after specific character string line
  g-4  g-5

[OK] [Cancel]
  4    5

FIG. 4

PRINTING APPARATUS AND PRINTING METHOD

BACKGROUND OF THE INVENTION

1. Field of Technology

The present invention relates to a printing apparatus (a printer) for printing print data received from a host computer on a receipt, and relates more particularly to a printing apparatus and a printing method that can delete a portion of the received print data from the host computer without modifying the host computer.

2. Description of Related Art

Printing methods enabling printers that print receipts using print data generated by and received from a host computer (software application program) to add and print other print data in a desired location in the received print data are currently known. Print data may be added to embellish the receipt or as a sales promotion tool, and may include, for example, a store logo, store name and address, or product coupons.

Printers that can add and print new print data without requiring modification of the host computer are also known. An example of such a printer is taught and disclosed in Japanese Unexamined Patent Appl. Pub. 2004-58323.

While the printer taught in Japanese Unexamined Patent Appl. Pub. 2004-58323 can generate store information of, for example, the store name and address to be added to a receipt and to be printed at the beginning of the receipt, the print data generated by the host computer may also include the same store information for printing at the beginning of the receipt. Therefore, unless the host computer is reconfigured to delete the store information from the print data output to the printer, the new print data containing the same store information for printing at the beginning of the receipt will be printed in addition to the conventionally generated store information, and the same information will thus be printed twice. Print data that was needed at one time but has become unnecessary likewise cannot be removed from the print data output to the printer without modifying the host computer or software application.

The present invention is directed to solving the foregoing problem by providing a printing apparatus and a printing method to enable print data received from a host computer to be selectively deleted without modifying the host computer or software application and printed as actual data.

SUMMARY

The printing apparatus according to the present invention enables receipts to be printed from actual print data generated by deleting unnecessary data from print data received from a host computer. The printing apparatus includes a receiving unit for receiving print data from the host computer; a deletion line setting unit for setting deletion lines to be deleted from the received print data; a print data deletion unit for deleting print data corresponding to the deletion lines set by the deletion line setting unit; and a printing unit for printing a receipt based on the actual print data, which is the print data output from the print data deletion unit after data deletion.

The printing method according to the present invention generates actual data for printing a receipt based upon selectively deleting lines of print data received from a host computer without modifying the host computer or application and comprises the steps of:

receiving lines of print data from the host computer;
setting a selected number of lines of print data for deletion from the received print data;
generating actual data by deleting the selected number of print lines, and
printing a receipt based on the actual print data.

A receipt can thus be printed using the received print data other than the line portions thereof set for deletion as the actual print data for printing a receipt. When unnecessary data is contained in the received print data, the unnecessary data can be specifically deleted. More particularly, an unnecessary part of the received print data can be deleted and the remaining print data can be printed without modifying the host computer or host application. Note that one line of print data as used herein means:

data from the first character in one line to the last character in the same one line plus print commands such as a carriage return command or paper feed command, or the maximum number of characters that can be printed by the printer on the one line of print data.

Furthermore, any single block of linear barcode, two-dimensional symbol, or image (graphic) data is also considered one line.

The printer prints one line of print data in response to each one line of print data received.

The receiving unit thus preferably receives print data in line units of one line per unit, and includes a leading edge detection unit for detecting the leading edge of the receipt, a first line setting unit for setting the line of data received immediately after the leading edge is detected by the leading edge detection unit as the first line of print data and a deletion line setting unit responsive to the detection of said leading edge for enabling the setting of a counting sequence for counting deletion lines and setting the selected number of lines of print data to be counted for deletion based on said first line data.

By thus setting the print data received immediately after the leading edge of the receipt is detected as the first line a desired number of lines can be easily deleted.

The term "Immediately after detecting the leading edge of the receipt" as used herein means immediately after the power turns on, immediately after a paper cut operation, and after the print buffer is cleared when an error occurs.

Preferably the receiving unit has a print data storage unit for receiving print data in line units and storing received print data in the order received; a trailing edge detection unit for detecting the trailing edge of the receipt; and a last line setting unit for setting the line of print data received immediately before the trailing edge of the receipt is detected as the last line of stored print data and enables the setting of a counting sequence for counting deletion lines backwards from said last line and further includes a deletion line setting unit which sets a selected number of lines of print data for deletion based upon said last line setting unit.

By thus setting the line of print data received immediately before the trailing edge of the receipt is detected as the last line (i.e. first detected line) of stored print data, a desired number of lines including the last line can be easily deleted by counting the desired number of lines to be deleted backward from the last (first detected) line. The term "Immediately before detecting the trailing edge of the receipt" as used herein means immediately before the receipt paper is cut (immediately before the paper cut command is executed).

Furthermore the printing apparatus preferably includes a specific character string storage unit for storing a specific character string line, represented by a line of print data including a specific character string for enabling the setting of a counting sequence for counting deletion lines using the next line after the specific character string line in the received print data is detected to start the deletion count; and a deletion line setting unit for setting a desired number of lines of print data for deletion based upon detection of said specific character string line in the received print data.

The printing apparatus preferably further includes a specific character string line deletion unit for deleting print data corresponding to the specific character string line together with lines of data corresponding to the specific character string line; and a selection unit for selecting whether to delete the specific character string line by means of the specific character string line deletion unit \This arrangement enables deleting print data set from the detection of the line containing the specific character string. Furthermore, by enabling selecting whether to delete the specific character string line, the specific character string line can be deleted as necessary.

Yet further preferably, the printing apparatus also has a logo data storage unit for storing logo data to be added to and printed with the print data; and a logo data insertion unit for inserting the logo data to the line before or the line after the specific character string line in the print data.

Logo data can thus be inserted as additional print data either before or after the line containing the specific character string. The name of a specific product can thus be set as the specific character string and a coupon corresponding to that product name can be inserted as logo data either before or after the receipt line containing that specific character string. An effective sales promotion tool can thus be provided for particular products.

Yet further preferably, the printing apparatus also has a top logo data storage unit for storing top logo data for insertion and printing at the beginning of the print data; and a top logo data insertion unit for inserting the top logo data immediately before the first line set by the first line setting unit.

This permits inserting a top logo containing a new store logo, store name and address, or other information immediately before the first line of the receipt instead of conventionally printing the store name and other information as text, for example. This also improves the appearance of the receipt, and thus helps create a more favorable impression of the store. The print data conventionally used as the top logo data can also be deleted.

The printing apparatus may also have a bottom logo data storage unit for storing bottom logo data for insertion and printing at the end of the print data; and a bottom logo data insertion unit for inserting the bottom logo data immediately after the last line set by the last line setting unit. This permits inserting a message for the customer or coupons and discount information for use on a future purchase as bottom logo data immediately after the last line of the receipt. This improves the appearance of the receipt, and helps attract repeat customers and improve customer loyalty. The print data conventionally used as the bottom logo data can also be deleted.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 4 shows sample screen shots of the deletion line configuration window and logo parameter configuration window;

DESCRIPTION OF THE PREFERRED EMBODIMENTS

Preferred embodiments of a printing apparatus and printing method according to the present invention are described below with reference to the accompanying figures.

Figure 1:
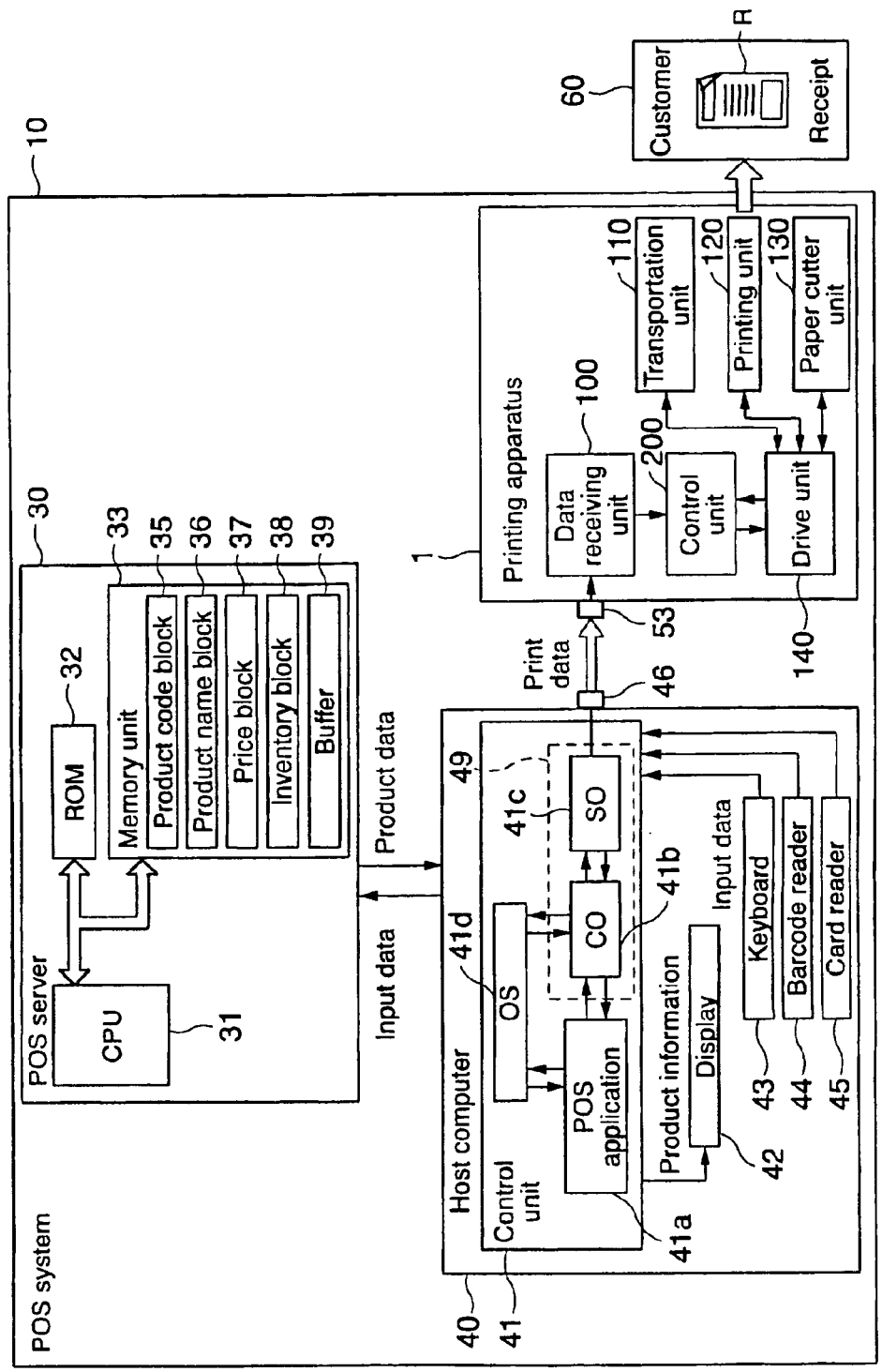
FIG. 1 is a block diagram of a POS system according to a preferred embodiment of the present invention.

A POS system 10 embodying the printing apparatus of the invention is shown in FIG. 1 for use in retail stores such as, for example, supermarkets and convenience stores, as well as in fast food stores and full-service restaurants. The host computer 40 generates print data based on input information entered by the user or operator relating to the products sold, and sends the print data to the printer 1 for printing a receipt.

The host computer 40 is connected through an interface to the printer 1 either by a wired connection (such as a RS-232C, parallel, USB, Ethernet, or LAN connection) or a wireless connection (such as a wireless LAN, Bluetooth, or IEEE 802.11 connection). In this example the host computer 40 and printer 1 are connected through connectors 46 and 53. Information about the purchased products is entered from the keyboard 43 or retrieved by reading a barcode from the products using a barcode reader 44. A card reader 45 can also be used to read a customer 60 credit card or membership (preferred customer) card and thus retrieve credit card transaction information or customer account information, for example. Based on the product data sent from the POS server 30 described below, product information is generated for displaying on a host computer 40 so that the customer 60 can verify the purchased products and prices.

The POS server 30 has a CPU 31 as a control device, and memory including ROM 32 and Memory unit 33 (such as RAM or hard disk drives). The CPU 31 processes data stored in a buffer 39 in Memory unit 33 according to a control program stored in ROM 32. A product master having a product code block 35, product name block 36, price block 37, and inventory block 38 is stored in Memory unit 33. Based on the input information from the host computer 40, the CPU 31 retrieves and outputs the product information such as the product code, product name, and price from the product master. Based on the received product information, the host computer 40 then generates print data for output to the printer 1 and product information for display on the display 42.

The host computer 40 is controlled by an OLE ("Object Linking and Embedding" Data converting Algorithm ) for Retail POS (OPOS below) printer driver that operates under Windows (R) or other operating system 41d. OPOS provides the POS application 41a running under the OS 41d with a device-independent interface to the printer 1, barcode reader 44, and other peripheral devices, and is composed of a control object (CO) 41*b* for each device category and a service object (SO) 41*c* for each device model.

The POS application 41 generates print data for printing on a receipt based on the product information sent from the POS server 30. This print data is sent by way of the OS 41*d* to the printer CO 41*b* and then from the printer CO 41*b* to the SO 41*c* corresponding to the model of printer 1. The SO 41*c* processes the print data to generate print commands using the command system of the printer 1 and then send the print commands and print data to the printer 1. Note that the foregoing OPOS is supplied to the user as a printer driver 49 combining the CO 41*b* and SO 41*c*.

The printer 1 is a receipt printer that uses a thermal head, and has a data receiving unit 100 for receiving control commands and print data from the host computer 40, a transportation unit 110, printing unit 120, paper cutter unit 130, a drive unit 140 for driving the printing unit 120 and paper cutter unit 130, and a control unit 200 controlling overall operation of the printer 1.

The control arrangement of this printer 1 is described in detail next with reference to FIG. 2.

Figure 2:
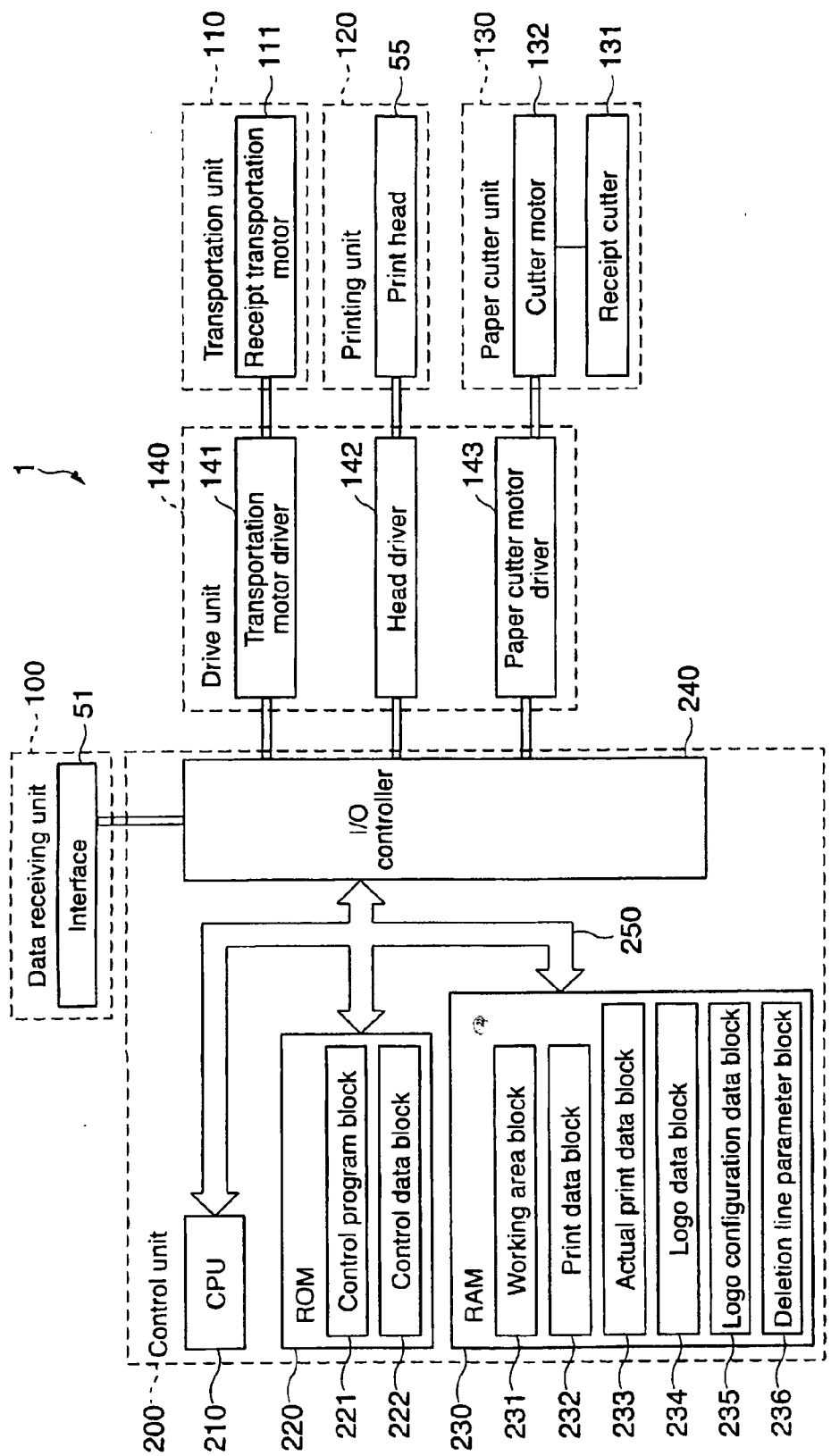
FIG. 2 is a control block diagram of a printing apparatus according to the present invention.

As more specifically shown in FIG. 2, the printer 1 has a data receiving unit 100, a transportation unit 110, a printing unit 120, a paper cutter unit 130, a drive unit 140, and a control unit 200.

The data receiving unit 100 has an interface 51 for exchanging data with the host computer 40.

The transportation unit 110 has a receipt transportation motor 111 and conveys the receipt R for printing.

The printing unit 120 has a print head 55 for printing data to the receipt R synchronized to transportation of the receipt R.

The paper cutter unit 130 has a receipt cutter 131 and cutter motor 132 for driving the receipt cutter 131 to cut the receipt R.

The drive unit 140 has a transportation motor driver 141, head driver 142, and paper cutter motor driver 143 for driving the transportation motor, print head, and paper cutter respectively.

The control unit 200 is connected to a drive unit 140 and a data receiving unit 100 to control overall operation of the printer 1.

The control unit 200 has a CPU 210, ROM 220, RAM 230, and input/output control unit (IOC:I/O controller) 240 interconnected over an internal bus 250.

ROM 220 has a control program block 221 for storing a control program run by the CPU 210 to control printing and deletion of print data as further described below, and a control data block 222 for storing control data and various tables for printing the received print data and deleting print data as described below.

The RAM 230 has a working area block 231 for storing flags such as the paper cut command flag, a print data block 232 for temporarily storing the print data received from the data receiving unit 100, an actual print data block 233, a logo data block 234, a logo configuration data block 235, and a deletion line parameter block 236.

The actual print data block 233 temporarily stores the print data that will actually be printed, including the data remaining after deleting the unneeded part of the received print data and the logo data that is actually printed on the receipt R.

The logo data block 234 stores a plurality of logo data units that are selectively added and printed as logo data at a desired position on the receipt R.

The logo configuration data block 235 stores parameters controlling which of the plural logo data units stored in the logo data block 234 will be selected as the print data for printing as the actual logo data on the receipt and where the selected logo data will be inserted (the insertion position).

The deletion line parameter block 236 stores the parameters setting what lines in the received print data will be deleted (the deletion lines) and thus not printed.

The RAM 230 is also constantly backed up so that the stored data is not lost if the power fails. Flash ROM or other nonvolatile memory could alternatively be used for the logo data block 234, logo configuration data block 235, and deletion line parameter block 236.

The logo data is preferably image data in order to improve the design and appearance of the receipt, but could be text data or a combination of text and image data.

The I/O controller 240 also includes logic circuits composed of gate arrays and custom IC devices for complementing the functions of the CPU 210 and handling interface signals for communication with peripheral circuits. The I/O controller 240 thus passes print data and control data received from the host computer 40 to the internal bus 250 either directly or after processing the data, and works in conjunction with the CPU 210 to output data and control signals output from the CPU 210 through the internal bus 250 to the printing unit 120 and other parts either directly or after processing the data.

Thus comprised, the CPU 210 receives signals and data from the other parts of the printer 1 via the I/O controller 240 by running a control program stored in ROM 220. The CPU 210 also processes data in RAM 230 based on the received signals and data, and controls printing by outputting signals and data through the I/O controller 240 to the printer 1.

Figure 3:
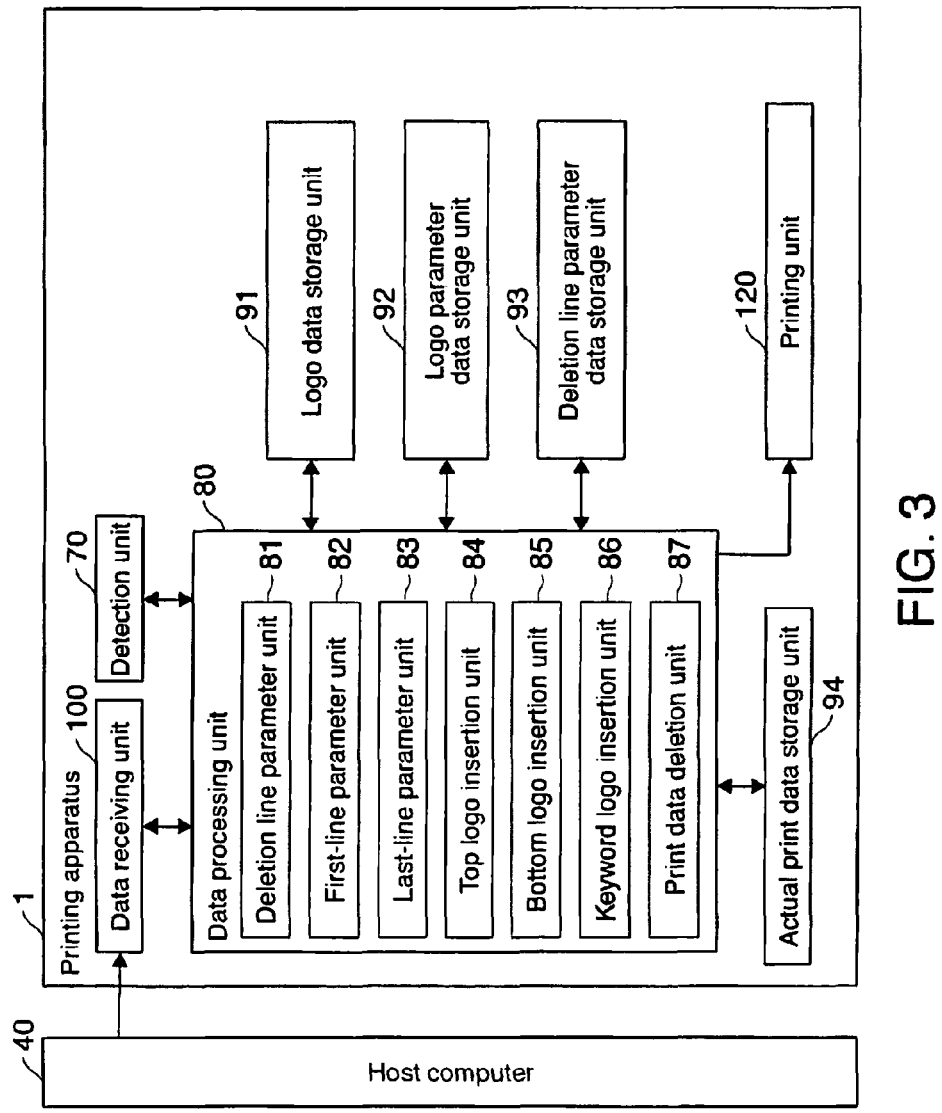
FIG. 3 is a function block diagram of a printing apparatus according to the present invention.

The control arrangement of the printer 1 is described in further detail below with reference to the function block diagram of the printer 1 shown in FIG. 3.

The printer 1 has a data receiving unit 100, logo data storage unit 91, logo parameter data storage unit 92, and deletion line parameter data storage unit 93. The content stored in the logo data storage unit 91, logo parameter data storage unit 92, and deletion line parameter data storage unit 93 can be rewritten by the user (operator) as needed.

The data receiving unit 100 recompiles the data received from the host computer 40 as line unit reception data.

The logo data storage unit 91 stores logo data for a plurality of logos.

The logo parameter data storage unit 92 stores parameters indicating what logo data is selected from among the plural logos stored in the logo data storage unit 91 for printing as the actual logo data on the receipt R, and the insertion position of the logo data.

The deletion line parameter data storage unit 93 stores a deletion line parameter indicating what line or lines are to be deleted from the received print data.

The printer 1 also has a detection unit 70. The detection unit 70 determines that the leading edge of the receipt is detected after (1) the power turns on, (2) after the buffer is cleared when an error occurs, and (3) immediately after cutting the previously printed receipt, and sets the leading edge flag ON. The detection unit 70 also determines that the trailing edge of the receipt is detected immediately before the paper is cut (before the paper cut command is executed).

The printer 1 also has a data processing unit 80, an actual print data storage unit 94 for temporarily storing the actual print data, and a printing unit 120 for printing the actual print data on the receipt R.

The data processing unit 80 adds the logo data to be added to the received print data minus the unnecessary data corresponding to the set deletion lines and thus generates the actual print data to be actually printed on the receipt R.

The data processing unit 80 has a deletion line parameter unit 81 for setting the unnecessary data to be deleted from the print data as the deletion lines. The data processing unit 80 also has a first-line parameter unit 82 for setting the print data to be printed immediately after the leading edge of the receipt is detected as the first-line print data, and a last-line parameter unit 83 for setting the print data printed immediately before the trailing edge of the receipt is detected as the last-line print data.

The data processing unit 80 also has a top logo insertion unit 84 and a bottom logo insertion unit 85.

The top logo insertion unit 84 inserts the logo data for one of the plural logos stored in the logo parameter data storage unit 92 as the top logo immediately before the first line set by the deletion line parameter unit 81.

The bottom logo insertion unit 85 inserts the logo data for one of the plural logos stored in the logo parameter data storage unit 92 as the bottom logo immediately after the last line set by the last-line parameter unit 83.

Figure 10:
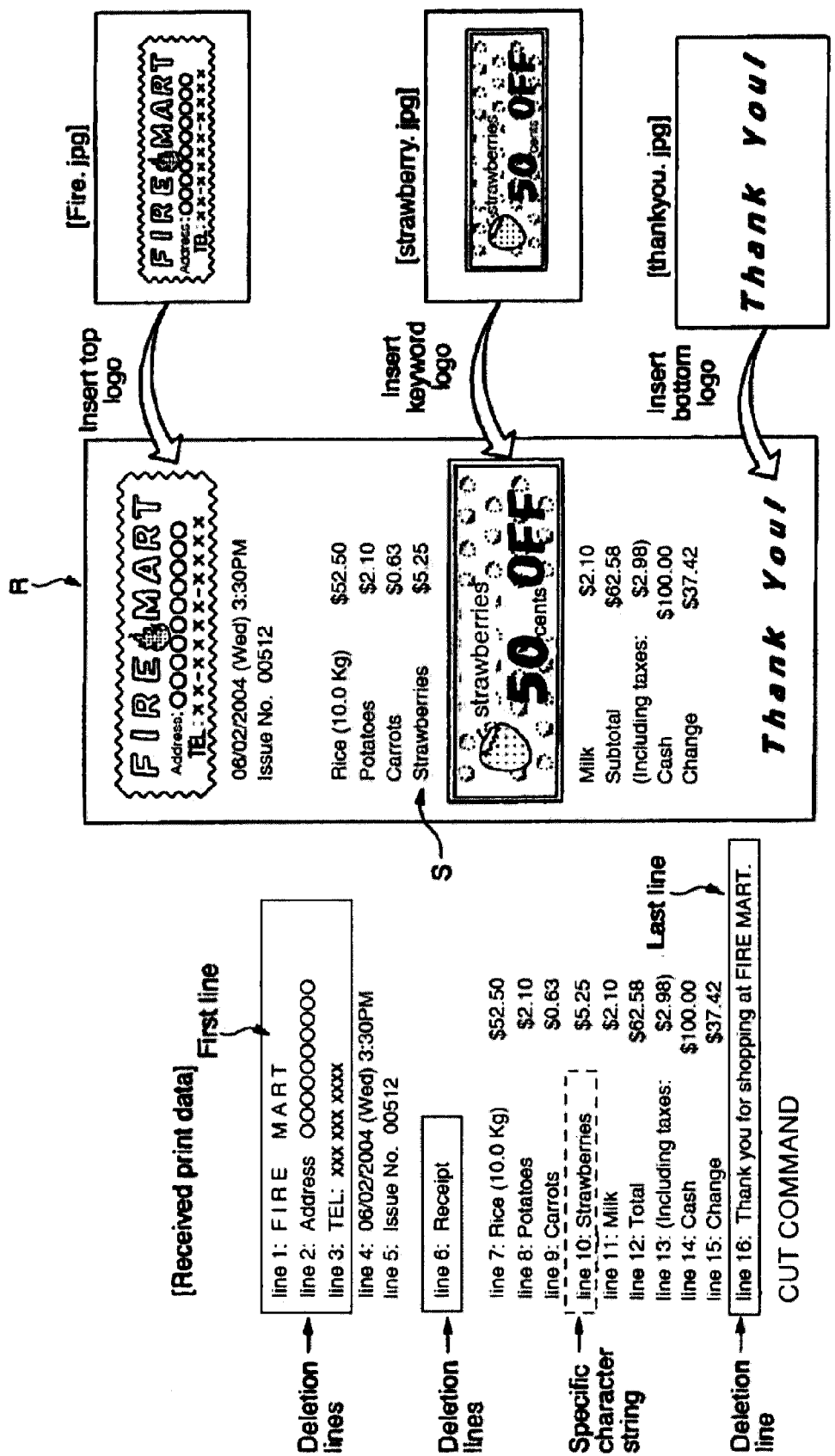
FIG. 10 shows a sample of a receipt printed by the present invention.

The data processing unit 80 also has a keyword logo insertion unit 86. A specific character string S (such as shown in FIG. 10) is stored in the deletion line parameter data storage unit 93 as the character string identifying the line where print data deletion starts. If this specific character string S is contained in the received print data, the print data for that line is set as the specific character string line, and the keyword logo insertion unit 86 inserts one of the plural logos stored in the logo data storage unit 91 as the keyword logo to the line before or after the specific character string line.

The data processing unit 80 also has a print data deletion unit 87. Based on the setting stored in the deletion line parameter data storage unit 93, the print data deletion unit 87 deletes the unnecessary data from the received print data.

The deletion line parameters and logo configuration parameters can thus be rewritten to memory as desired by the user (operator). How the deletion line parameters and logo configuration parameters are set is described next. The deletion line and logo configuration parameters are set by the user (operator) using an external processor (not shown in the figure) having an input device such as a keyboard and a display device such as a monitor, the external processor being connected to the printer 1 through the interface 51. The host computer 40 can be used as this external processor.

FIG. 4 shows samples of display screens used to set the deletion line parameters and logo configuration parameters. As shown in FIG. 4, this embodiment of the invention uses tabs to select the desired parameter configuration window. As shown in the deletion line configuration window D1, there are four methods of setting the deletion line: (a) a direct setting method whereby the user directly sets the first deletion line referenced to the first line of the receipt and the number of lines to delete (see screen D1, section a); (b) a first line setting method whereby the first line of the receipt is the first deletion line and the user specifies only the number of lines to delete (see screen D1, section b); (c) a last line setting method whereby the last line of the receipt is the first deletion line and the user sets only the number of lines to be deleted counting backwards from the last line (see screen D1, section c); and (d) a specific character string line setting method whereby the deletion line is determined by the specific character string line (see screen D1, section d).

The deletion line can be specified using all four of these methods or using only one. More specifically, any number of these methods can be used in combination to specify the deletion line.

The direct setting method shown in screen area D1:a is described by way of example below. When the deletion lines are defined by directly setting the first deletion line and the number of lines to delete, the user (operator) checks the checkbox a-1, selects the line number of the first deletion line from list a-2 (line 6 is selected in FIG. 4), and then selects the number of lines to delete from list box a-3 (1 line selected in FIG. 4).

If the deletion line is set by setting the first line as the based on first deletion line, the user (operator) similarly checks the checkbox b-1 in screen area D1:b and then specifies the number of lines in list box b-2 (3 lines selected in FIG. 4).

To set the last line as the based on first deletion line, the user (operator) similarly checks the checkbox c-1 in screen area D1:c and then specifies the number of lines in list box c-2 (1 lines selected in FIG. 4).

To set the deletion line referenced to the specific character string line, the user (operator) similarly checks the checkbox d-1 in screen area D1:d and then enters the specific character string S identifying the deletion line directly into text box d-2 ("strawberry" is set as the specific character string S in this embodiment). The number of lines to delete using the specific character string line as the first line is then entered in list box d-3 (0 lines selected in FIG. 4).

While 0 normally cannot be selected in list boxes a-2, a-3, b-2, and c-2, 0 can be selected from list box d-3 to enable not deleting text starting from the next line after the specific character string line.

Whether to delete or not delete the specific character string line is selected using radio buttons d-4 and d-5 ("do not delete" is selected in FIG. 4).

When the OK button 2 is clicked after entering the desired settings, the user settings entered as described above are stored in the deletion line parameter block 236 of the printer 1 as the most recent deletion line parameters. If the cancel button 3 is clicked, the deletion line parameters are not updated and the deletion line configuration window is closed.

A method for directly setting deletion lines in plural places on a single receipt can also be added to the above methods. This enables deleting the desired lines even when the print data to be deleted is not consecutive.

The logo configuration window D2 has sections for configuring three different logos, the top logo, bottom logo, and keyword logo.

To print the top logo, the top logo checkbox e-1 in the top logo settings in screen area D2:e is checked as shown in FIG. 4, and the lookup button e-3 is clicked to display and select the logo to be printed as the top logo from a list of the names of the logos stored in the logo data block 234 (this list is not shown in the figures). The file name of the selected logo is then displayed in text box e-2 ("fire.jpg" is selected in this example).

To print the bottom logo, the bottom logo checkbox f-1 in the bottom logo settings in screen area D2:f is checked as shown in FIG. 4, and the lookup button f-3 is clicked to display and select the logo to be printed as the bottom logo from a list of the names of the logos stored in the logo data block 234 (this list is not shown in the figures). The file name of the selected logo is then displayed in text box f-2 ("thankyou.jpg" is selected in this example).

To print the keyword logo, the keyword logo checkbox g-1 in the keyword logo settings in screen area D2:f is checked as shown in FIG. 4, and the lookup button g-3 is clicked to display and select the logo to be printed as the keyword logo from a list of the names of the logos stored in the logo data block 234 (this list is not shown in the figures). The file name of the selected logo is then displayed in text box g-2 ("strawberry.jpg" is selected in this example). Whether to insert the keyword logo at the line before or the line after the specific character string line is also set using radio buttons g-4 and g-5 (insertion to the next line is selected in FIG. 4).

When the OK button 4 is clicked after entering the desired settings as described above, the entered parameters are stored as the newest logo data parameters in the logo configuration data block 235 of the printer 1. If the cancel button 5 is clicked, the logo configuration parameters are not updated and the logo configuration window is closed.

Only one logo can be specified for each of the top logo, bottom logo, and keyword logo in this embodiment of the invention, but an arrangement enabling setting plural logos for each of the top logo, bottom logo, and keyword logo is obviously also possible.

Printing control in a printer 1 according to the present invention is described next with reference to the flow charts in FIG. 5 through FIG. 9.

The operation described below starts from after the printer 1 prints one receipt and then cuts the paper and issues the receipt according to a paper cut command received from the host computer 40 (S01). After cutting the receipt (S01), the leading edge flag is set ON to denote detection of the leading edge of the receipt (S02).

When print data for the current receipt has been received from the host computer 40 (S03 returns yes), the leading edge detection unit determines if the leading edge of the receipt has been detected, that is, whether the leading edge flag is ON or OFF (S04). If the leading edge flag is ON (S04 returns yes), the leading edge setting process runs (S05). Note that the leading edge flag is set ON after the receipt is cut (S01) as described above, after the power turns on, and after the print buffer is cleared when an error occurs.

Figure 5:
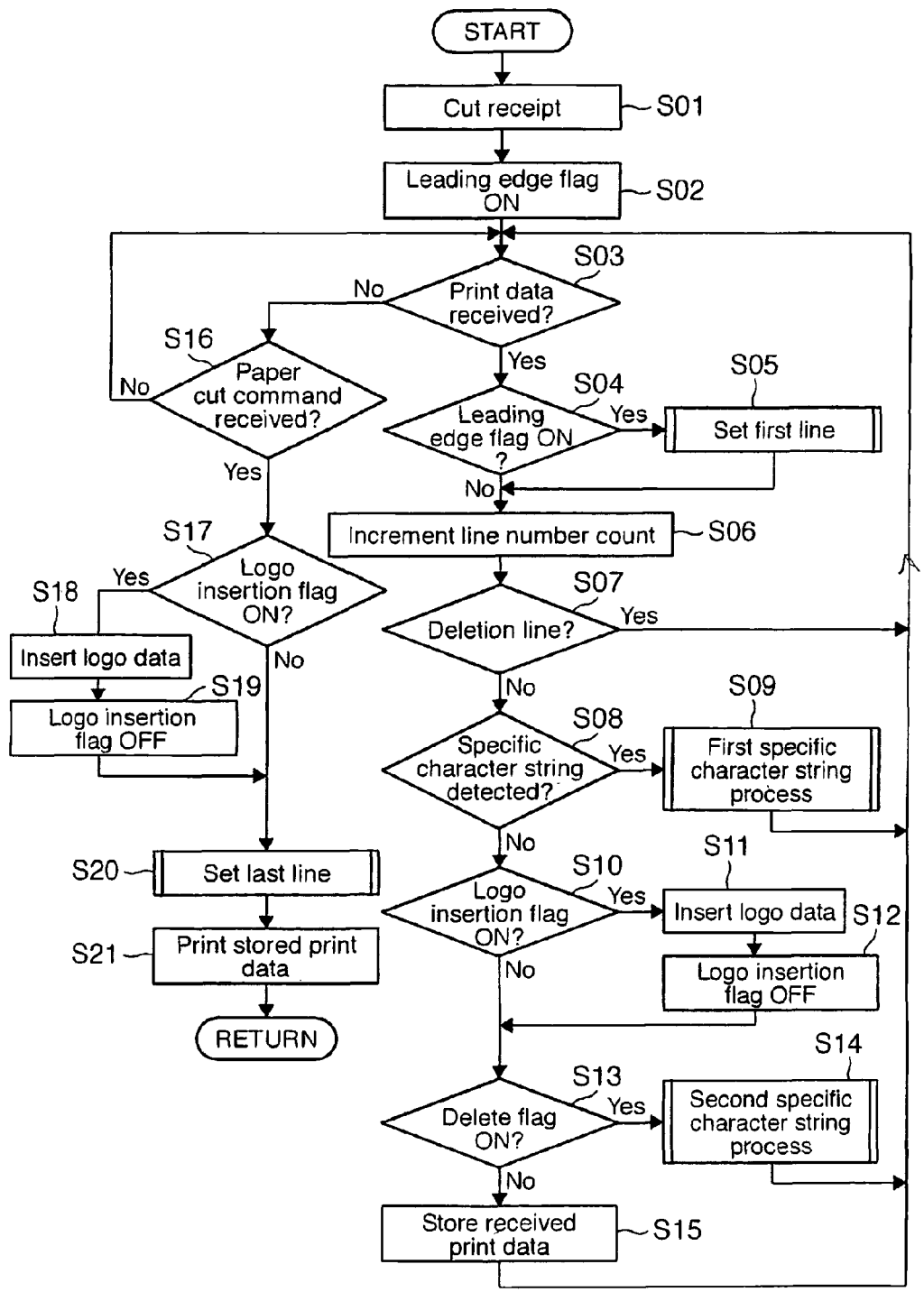
FIG. 5 is a flow chart of the overall printing process of a printing apparatus according to the present invention.
Figure 6:
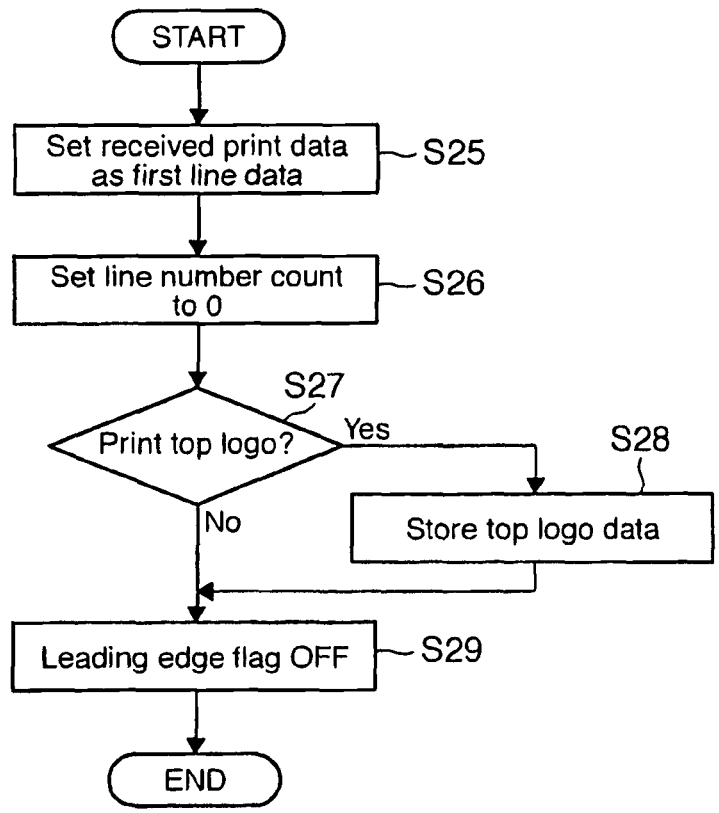
FIG. 6 is a flow chart of the first line setting process in a printing apparatus according to the present invention.

FIG. 6 is a flow chart of the first line setting process (S05 in FIG. 5).

The printer 1 sets the print data received when the leading edge flag is ON as the first line data (S25) and sets the line number count to 0 (S26).

Whether a top logo is to be printed is then determined from the logo configuration parameters (S27). If the top logo is to be printed (S27 returns yes), the top logo data determined from the logo configuration parameters is stored to the actual print data block 233 of the printer 1 (S28).

The leading edge flag is then turned OFF (S29), and control returns to the printing process shown in FIG. 5.

Note that data is written to the actual print data block 233 of the printer 1 in the order in which the data was stored.

Referring again to FIG. 5, when step S04 determines that the leading edge flag is OFF (S04 returns no) and when the leading edge setting process runs (S05) ends, the line number count is incremented (S06).

Whether the received print data corresponds to the deletion line or not is then determined (S07). Whether the received print data is the deletion line or not is limited to using the (a) direct setting method and the (b) first line setting method in the deletion line configuration window D1 shown in FIG. 4. The (c) last line setting method and the (d) specific character string line setting method shown in FIG. 4 are not used at this time.

By incrementing the line count, the printer 1 always knows to which line of print data the received print data corresponds. By thus knowing the line number of the received print data, the printer 1 can determine whether the received print data corresponds to the deletion line set by the (a) direct setting method or the (b) first line setting method.

If the received print data corresponds to the deletion line (S07 returns yes), the printer 1 drops received print data corresponding to the deletion line (not shown) and returns to step S03 to wait to receive the next print data. If the received print data does not correspond to the deletion line (S07 returns no), whether the received print data contains the specific character string S is determined (S08). If the specific character string S is contained in the received print data (S08 returns yes), the printer 1 executes the first specific character string process (S09).

This first specific character string process is described next with reference to the flow chart in FIG. 7.

If the specific character string S is contained in the received print data, the printer 1 determines where to insert the keyword logo based on the logo configuration parameters (S31).

If the keyword logo is inserted to the line before the specific character string line (S31 returns PREVIOUS), the keyword logo data read based on the logo configuration parameters is stored to the actual print data block 233 (S32).

If the keyword logo is inserted to the line after the specific character string line (S31 returns NEXT), the logo insertion flag is set ON (S33).

The printer 1 then references the deletion line parameters to acquire the deletion line count n, that is, the number of lines to delete starting from the line following the specific character string line. If the deletion line count n is set to 1 or more (S34 returns yes), the deletion flag is set ON and the printer 1 drops (not shown in the figure) the line following the specific character string line as the one deletion line (S35).

The printer 1 then reads the deletion line parameters again to determine whether to delete the specific character string line (S36).

If deleting the specific character string line is not set (S36 returns no), the received print data, that is, the specific character string line, is stored to the actual print data block 233 in the printer 1 (S37).

If deleting the specific character string line is set (S36 returns yes), the printer 1 drops (not shown in the figure) the deletion line corresponding to the specific character string line.

The printer 1 then returns to step S03 and waits to receive the next print data.

Referring again to FIG. 5, operation when the specific character string is not contained in the received print data (S08 returns no) is described next.

If the specific character string is not contained in the received print data, whether the logo insertion flag is ON is determined (S10).

If the logo insertion flag is ON (S10 returns yes), that is, the keyword logo is to be inserted to the line following the specific character string line, the keyword logo data is read based on the logo configuration parameters and stored to the actual print data block 233 of the printer 1 (S11).

The logo insertion flag is then turned OFF (S12).

Figure 7:
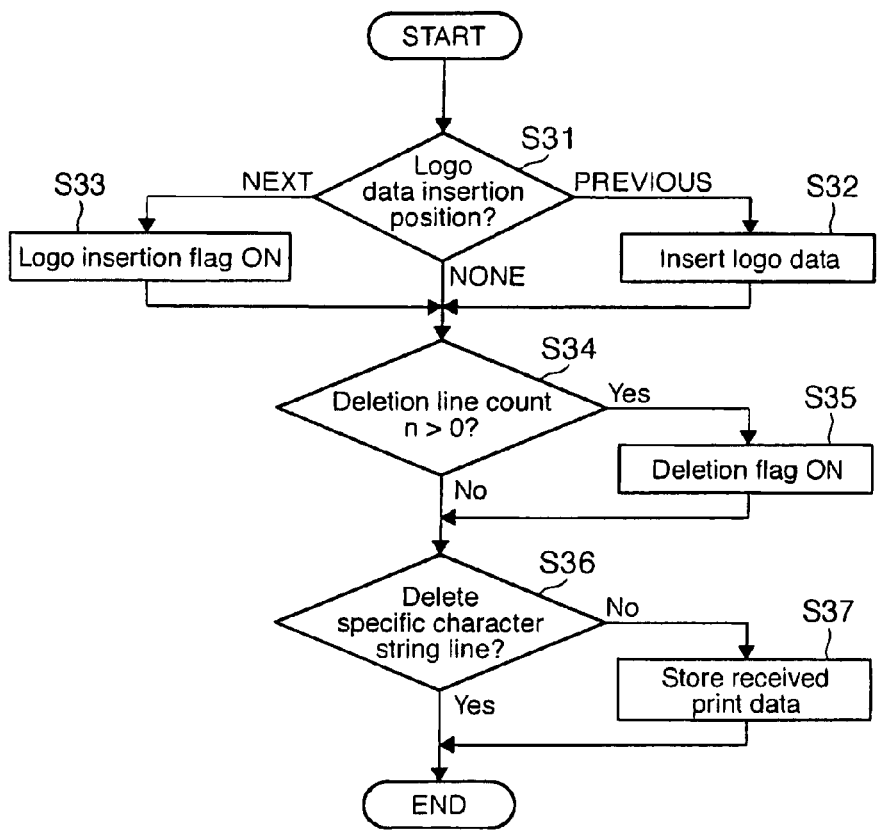
FIG. 7 is a flow chart of the first specific,character string process in a printing apparatus according to the present invention.

The printer 1 then determines if the deletion flag set in the first specific character string process (S35) shown in FIG. 7 is ON or OFF (S13). If the deletion flag is ON (S13 returns yes), the printer 1 executes the second specific character string process (S14).

Figure 8:
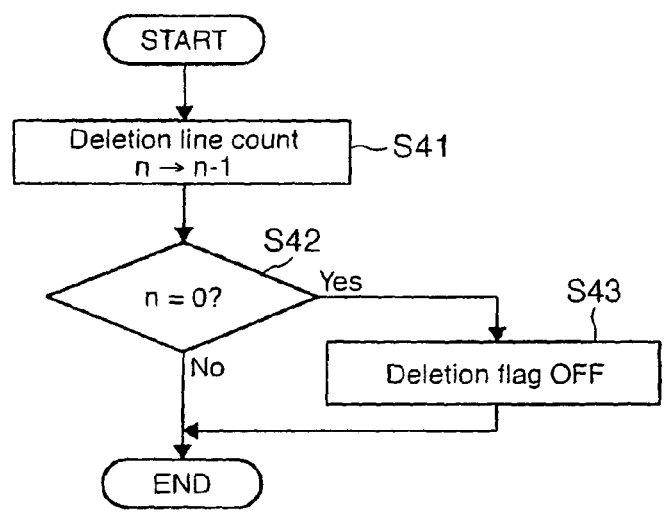
FIG. 8 is a flow chart of the second specific character string process in a printing apparatus according to the present invention.

This second specific character string process is described next with reference to the flow chart in FIG. 8.

If the deletion flag is ON, the deletion line count n following the specific character string line acquired from the first specific character string process shown in FIG. 7 is decreased by one (S41) and thus updated.

If the deletion line count n after being updated is 0 (S42 returns yes), deleting the deletion line count n following the specific character string line is determined to have ended and the deletion flag is turned OFF (S43).

If the updated deletion line count n is not 0, the printer 1 drops (not shown in the figure) the deletion lines in the next and subsequent lines after the specific character string line (S42 returns no), and the deletion flag thus remains ON in order to continue deleting the specified deletion line count n after the specific character string line.

The printer 1 then returns to step S03 in FIG. 5 and waits to receive the next print data.

Referring again to FIG. 5, operation when the deletion flag is not ON (S13 returns no) is described next.

If the deletion flag is not ON, the printer 1 stores the received print data in the actual print data block 233 (S15) and then loops back and waits to receive the next print data (S03).

If additional print data is not received from the host computer 40 (S03 returns no) and the paper cut command denoting the end of the print data for the current receipt is received (S16 returns yes), the printer 1 first determines if the logo insertion flag is ON or OFF (S17). This is because if a paper cut command is received immediately after the specific character string line is received and the keyword logo is set for insertion to the line following the specific character string line, the logo insertion flag is ON.

If the logo insertion flag is ON (S17 returns yes), the keyword logo data is stored to the actual print data block 233 based on the logo configuration parameters (S18), and the logo insertion flag is then turned OFF (S19).

The specific character string line is typically not the last line, however, and this sequence of steps S17 to S19 may be omitted.

The printer 1 then executes the last line setting process (S20). If the data received from the host computer 40 is neither print data nor a paper cut command (S16 returns no), the printer 1 runs a process (not shown in the figure) corresponding to the received print command, and then returns to wait to receive the next print data (S03).

Figure 9:
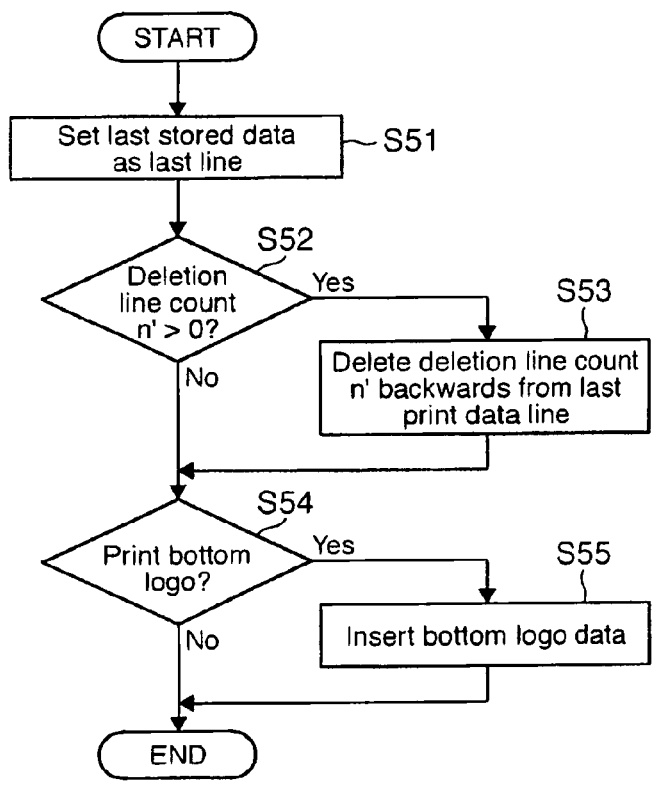
FIG. 9 is a flow chart of the last line setting process in a printing apparatus according to the present invention.

The last line setting process is described below with reference to the flow chart shown in FIG. 9.

When a paper cut command for the current receipt is received from the host computer 40, the printer 1 (trailing edge detection unit) detects the trailing edge of the receipt, references the actual print data block 233 of the printer 1, and sets the last saved print data ad the last line data (S51).

The printer 1 then reads the deletion line parameters to acquire the deletion line count n', which is set using the last line as the based on first deletion line.

If the deletion line count n' is set to 1 or more (S52 returns yes), the printer 1 reads the actual print data block 233 and deletes the last n' lines of print data starting from the last line of the actual print data (S53).

Whether a bottom logo is printed is then determined based on the logo configuration parameters (S54). If the bottom logo is to be printed (S54 returns yes), the bottom logo data retrieved based on the logo configuration parameters is inserted after the last line in the actual print data block 233 (S55).

The last line setting process then returns to the printing process shown in FIG. 5.

When the last line setting process ends (S20), the printer 1 prints the actual print data stored in the actual print data block 233 (S21). The printed receipt is then cut (S01), the leading edge flag is set ON again (S02), and the process for printing one receipt ends. The actual print data is stored in the actual print data block 233 until a paper cut command is received from the host computer 40 in the foregoing embodiment, but the actual print data block 233 could be eliminated and the print data printed one line at a time in order to reduce the required memory capacity. This is accomplished by printing the print data at the timing at which the print data is saved to the actual print data block 233 in the flow chart shown in FIG. 5, that is, in steps S15, S25 (S05), and S37 (S09). If the print data is printed one line at a time without being buffered as described above, however, the number of lines to delete cannot be set using the last line as the based on first deletion line (that is, the (c) last line setting method shown in screen area D1:c in FIG. 4 cannot be used).

Furthermore, this embodiment identifies the deletion lines and runs the other deletion and insertion processes each time one line of print data is received. The invention shall not be so limited, however. More specifically, the processes for deleting print data corresponding to the deletion lines and inserting logo data can be executed after all print data for one receipt has been received (after the paper cut command is received).

The printing method of the present invention is further described below referring to a receipt R printed with actual print data as shown in FIG. 10. To print the receipt R shown in FIG. 10 the printer 1 processes the print data shown on the left side of the figure received from the host computer 40 to generate the actual print data. The receipt R is then printed according to this actual print data.

As shown in the middle column of the figure, the top logo "fire.jpg" set in the logo setting screen D2:e in FIG. 4 is inserted to the beginning of the receipt, and the deletion lines set in the deletion line setting area D1:b, that is, the first three lines of print data starting from the first line received, are deleted.

In addition, the deletion line set in deletion line configuration area D1:a, that is, line 6 of the received print data, is also deleted.

Furthermore, because the specific character string S set in deletion line configuration area D1:d is contained in print data line 10, line 10 of the print data is the specific character string line and the keyword logo "stawberry.jpg" is inserted to the line following the specific character string line.

Furthermore, the last line before the paper cut command, that is, line 16, is the last line of the print data and the data for line 16 is deleted based on the settings in deletion line configuration area D1:c.

The bottom logo "thankyou.jpg" is also set for insertion to the end of the receipt based on the settings in deletion line configuration area D1:d.

A printer 1 according to the present invention can thus delete unnecessary data contained in the received print data. As a result, a printer 1 according to the present invention can print an attractive, easy to read receipt without duplicating printing the same or similar content.

The parts (functions) of the printer 1 described above can also be rendered in a software program.

This program can also be provided stored to a recording medium (not shown in the figure) such as CD-ROM, flash ROM, a memory card (such as Compact Flash (R), Smart Media, and memory sticks), a Compact Disc, a magneto-optical disc, DVD media, or floppy disk.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A printing apparatus for printing a receipt in response to actual print data generated by deleting selected lines of data from print data received from a host computer, the printing apparatus comprising:

a receiving unit for receiving a plurality of consecutive lines of print data from the host computer;

a deletion line setting unit for setting a selected number of lines of the received print data for deletion to accommodate the printing of logo data on the receipt;

a print data deletion unit for deleting the lines of the received print data selected and set for deletion by the deletion line setting unit to generate actual print data without modifying the host computer or any application running thereon;

a printing unit for printing a receipt in response to the actual print data generated from the print data deletion unit without modifying the host computer or any application running thereon; and one of a first line setting unit responsive to detection of a leading edge of the receipt, and a specific character string storage unit for storing a specific character string line, either for enabling the setting of a counting sequence for counting deletion lines;

wherein the deletion line setting unit sets a desired number of lines of the received print data to be counted for deletion based on one of the detected leading edge of the receipt and detection of the specific character string line in the received print data.

2. A printing apparatus as described in claim 1 further comprising:

a leading edge detection unit for detecting the leading edge of the receipt, wherein the first line setting unit sets the line of print data received immediately after the leading edge is detected as first line data and the deletion line setting unit sets a desired number of lines of the received print data to be counted for deletion based on said first line data.

3. A printing apparatus as described in claim 2, further comprising:

a top logo data storage unit for storing top logo data; and a top logo data insertion unit for inserting the top logo data immediately before the first line set by the first line setting unit.

4. A printing apparatus as described in claim 1, wherein:

the receiving unit comprises a print data storage unit for receiving each line of print data and for storing the received print data in the line order received;

a trailing edge detection unit for detecting the trailing edge of the receipt; and a last line setting unit responsive to the detection of the trailing edge of the receipt for setting the line of print data received immediately before the trailing edge of the receipt as the last line of stored print data and for enabling the setting of a counting sequence for counting deletion lines backwards from said last line, wherein said deletion line setting unit sets a desired number of lines of the received print data for deletion based upon operation of said last line setting unit.

5. A printing apparatus as described in claim 4, further comprising:

a bottom logo data storage unit for storing bottom logo data; and a bottom logo data insertion unit for inserting the bottom logo data immediately after the last line set by the last line setting unit.

6. A printing apparatus as described in claim 1, further comprising:

a specific character string storage unit for storing the specific character string line, which is represented by a line of print data, wherein the setting of the counting sequence for counting deletion lines is carried out using the next line after the specific character string line in the received print data to start the deletion count.

7. A printing apparatus as described in claim 6, wherein the print data deletion unit further comprises:

a specific character string line deletion unit for deleting lines of .print data starting from the specific character string line, and a selection unit for selecting whether to also delete the specific character string line in response to said specific character string line deletion unit.

8. A printing apparatus as described in claim 6 further comprising:

a logo data storage unit for storing the logo data to be added to and printed on the receipt; and a logo data insertion unit for inserting the logo data to the line before or the line after the specific character string line in the actual print data.

9. A printing apparatus as described in claim 7 further comprising:

a logo data storage unit for storing the logo data to be added to and printed on the receipt; and a logo data insertion unit for inserting the logo data to the line before or the line after the specific character string line in the actual print data.

10. A printing method for generating actual data for printing a receipt based upon selectively deleting lines of print data received from a host computer, comprising the steps of:

receiving lines of print data from the host computer;

detecting a leading edge of a receipt to be printed;

setting a line of print data received immediately after the leading edge is detected as first line data;

enabling a counting sequence for counting a desired number of print lines for deletion based on the first line data; and deleting the desired number of print lines from the received print data to accommodate the printing of logo data and generating actual print data comprising the logo data and the received print data less the data of the deleted print lines for printing a receipt without modifying the host computer or any application running thereof.

11. A printing method for generating actual data for printing a receipt based upon selectively deleting lines of print data received from a host computer, comprising the steps of:

receiving and storing each line of print data from the host computer in a line sequence in the order received;

detecting the trailing edge of a receipt to be printed;

setting the line of print data received immediately before the trailing edge of the receipt as the last line of stored print data;

enabling a backward counting sequence for counting a desired number of print lines to be deleted backwards from said last line of stored print data;

deleting the desired number of print lines from the received print data to accommodate the printing of logo data, and generating actual print data comprising the logo data and the received print data less data of the deleted print lines without modifying the host computer or any application running thereon; and printing the receipt based on actual print data.

* * * * *